United States Patent Office 2,929,712
Patented Mar. 22, 1960

2,929,712
ANIMAL FEED COMPOSITION

William Pitner Johnson, Pennington, N.J., and Ralph Francis Elliott, Nanuet, N.Y., assignors to American Cyanamid Company, New York, N.Y., a corporation of Maine No Drawing. Application August 19, 1957
Serial No. 679,056

14 Claims. (Cl. 99—2)

This invention relates to an animal feed composition effective in accelerating the growth rate of animals. This invention further relates to a combination of a tetracycline antibiotic, an estrogen derivative and an anthelmintic agent as an additive to animal feeds which significantly enchances the growth rate of animals. This invention relates more particularly to a method of raising ruminants, monogastric animals and poultry, and a composition therefor, whereby their growth rate is significantly accelerated at a decreased cost per unit of weight gained.

In its broader aspects, the present invention contemplates the addition to an animal ration of pre-determined critical amounts of any one of several of the tetracycline antibiotics, any one of several natural or synthetic estrogen-like compounds including diethylstilbestrol or its derivatives, hexestrol, benzestrol, etc., and an anthelmintic such as phenothiazine.

In the past, combinations of chlortetracycline in animal feeds, and stilbestrol in animal feeds, have been known as growth promoters. Phenothiazine has been used in the past as an anthelmintic. However, the combination of this invention produces an accelerated rate of growth which is wholly unexpected from that observed heretofore for each of the components thereof.

In order to better illustrate the present invention, the following tables and descriptive matter are presented. These tables and descriptive matter show field trials of feed lots in steers.

Eighty 650-pound feeder steers of uniform weight and comformation were placed in 16 pens with 5 head per pen. The various groups of steers were fed on a standard feed yard basal ration with some of the groups receiving chlortetracycline, some receiving stilbestrol, some receiving phenothiazine, and some receiving combinations of these additives. The quantity of chlortetracycline was about 75 mg. per steer per day, the quantity of stilbestrol about 10 mg. per steer per day, and the quantity of phenothiazine about 2 grams per steer per day. The results of this feeding program appear below.

The following rations and supplements were utilized in this feeding program:

Basal ration:

| | Lbs. |
|---|---|
| Corn chop | 500 |
| Quaker oats molasses meal | 300 |
| Milo | 300 |
| Bran | 140 |
| Cottonseed hulls | 200 |
| Cottonseed meal | 50 |
| Linseed meal | 50 |
| Schumacher milo | 300 |
| Total | 1840 |

Supplement C:

| | Lbs. |
|---|---|
| Dicalcium phosphate | 20.0 |
| Sodium chloride | 25.0 |
| Calcium carbonate | 25.0 |
| Trace mineral mix | 5.0 |
| Vitamin A (10,000 units per gram) | 25.0 |
| Fortafeed 249C | 6.25 |
| Soybean meal (Aurofac grade) | 16.0 |
| Alfalfa meal (17%) | 816.55 |
| Citrus meal | 61.2 |
| Total | 1000.00 |

Supplement A:

| | Lbs. |
|---|---|
| Aurofac-10 [1] | 137.0 |
| Dicalcium phosphate | 20.0 |
| Sodium chloride | 25.0 |
| Calcium carbonate | 25.0 |
| Trace mineral mix [2] | 5.0 |
| Vitamin A (10,000 units per gram) | 25.0 |
| Fortafeed 249C [3] | 6.25 |
| Alfalfa meal (17%) | 756.75 |
| Total | 1000.00 |

[1] Aurofac-10 contains approximately 10 to 12 grams of chlortetracycline per pound.
[2] Trace Mineral Mix contains about 6% manganese as the oxide thereof, about 2% iron as the carbonate, about 0.2% copper as the hydroxide, about 0.12% iodine as potassium iodide, about 0.02% cobalt as the carbonate, and between about 26.5 and 31.8% calcium as the stearate.
[3] Fortafeed 249C is a vitamin mixture containing per pound 4 grams of pantothenic acid, 2 grams of riboflavin, 9 grams of niacin, 16 grams of choline chloride and 64 mg. of folic acid and soybean meal.

Supplement D:

| | Lbs. |
|---|---|
| Dicalcium phosphate | 20.0 |
| Sodium chloride | 25.0 |
| Calcium carbonate | 25.0 |
| Trace mineral mix | 5.0 |
| Vitamin A (10,000 units) | 25.0 |
| Fortafeed 249C | 6.25 |
| Soybean meal (Aurofac grade) | 16.0 |
| Citrus meal | 61.2 |
| Alfalfa meal (17%) | 795.75 |
| Stilbestrol premix (2 gm./lb.) | 20.8 |
| Total | 1000.00 |

Supplement P:

| | Lbs. |
|---|---|
| Dicalcium phosphate | 20.0 |
| Sodium chloride | 25.0 |
| Calcium carbonate | 25.0 |
| Trace mineral mix | 5.0 |
| Vitamin A (10,000 units) | 25.0 |
| Fortafeed 249C | 6.25 |
| Soybean meal (Aurofac grade) | 16.0 |
| Citrus meal | 61.2 |
| Alfalfa meal (17%) | 806.55 |
| Phenothiazine (402 gms./lb.) | 10.0 |
| Total | 1000.00 |

Controls in two groups, I and IA, were fed on the basal ration, plus supplement C as follows:

| | Lbs. |
|---|---|
| Basal ration | 1840 |
| Supplement C | 160 |
| Total | 2000 |

Groups II and IIA received about 75 mg. of chlortetracycline per steer per day as follows:

|  | Lbs. |
|---|---|
| Basal ration | 1840 |
| Supplement A | 6 |
| Supplement C | 154 |
| Total | 2000 |

Groups III and IIIA received about 10 mg. of stilbestrol per steer per day as follows:

|  | Lbs. |
|---|---|
| Basal ration | 1840 |
| Supplement D | 24 |
| Supplement C | 136 |
| Total | 2000 |

Groups IV and IVA received about 2 g. of phenothiazine per steer per day as follows:

|  | Lbs. |
|---|---|
| Basal ration | 1840 |
| Supplement P | 40 |
| Supplement C | 120 |
| Total | 2000 |

Groups V and VA received about 75 mg. of chlortetracycline per steer per day plus about 10 mg. of stilbestrol per steer per day as follows:

|  | Lbs. |
|---|---|
| Basal ration | 1840 |
| Supplement A | 6 |
| Supplement D | 24 |
| Supplement C | 130 |
| Total | 2000 |

Groups VI and VIA received about 75 mg. of chlortetracycline, plus about 2 g. of phenothiazine respectively per steer per day as follows:

|  | Lbs. |
|---|---|
| Basal ration | 1840 |
| Supplement A | 6 |
| Supplement P | 40 |
| Supplement C | 114 |
| Total | 2000 |

Groups VII and VIIA received about 10 mg. of stilbestrol, plus about 2 g. of phenothiazine respectively per steer per day as follows:

|  | Lbs. |
|---|---|
| Basal ration | 1840 |
| Supplement D | 24 |
| Supplement P | 40 |
| Supplement C | 96 |
| Total | 2000 |

Groups VIII and VIIIA received about 10 mg. of stilbestrol, about 2 g. of phenothiazine and about 75 mg. of chlortetracycline respectively per steer per day as follows:

|  | Lbs. |
|---|---|
| Basal ration | 1840 |
| Supplement D | 24 |
| Supplement P | 40 |
| Supplement A | 6 |
| Supplement C | 90 |
| Total | 2000 |

Each of the eight paired groups of steers were weighed at the seventh day, the thirty-fifth day, the sixty-third day, the ninety-first day and the one hundred-nineteenth day. Table 1 illustrates the observations made between the first and one hundred-nineteenth days inclusive, and are representative of the observations made throughout the feeding program.

Table 1

| Groups | Average Weight In Pounds | Average Gain In Pounds | Cost Per Pound of Gain |
|---|---|---|---|
| I and IA | 1,052 | 406 | $.217 |
| II and IIA | 1,087 | 427 | .206 |
| III and IIIA | 1,071 | 439 | .214 |
| IV and IVA | 1,014 | 376 | .232 |
| V and VA | 1,082 | 435 | .207 |
| VI and VIA | 1,054 | 401 | .227 |
| VII and VIIA | 1,070 | 429 | .210 |
| VIII and VIIIA | 1,124 | 473 | .195 |

It is particularly significant to note that the addition of the combination of chlortetracycline, diethylstilbestrol and phenothiazine substantially enhances the growth rate of the steers in the above feeding experiment. This growth rate from this three-part supplement combination is significantly greater than the growth rate observed with the controls or any of the groups of steers to which any of the single additives were fed, or any of the groups to which any of the three two-part combinations were fed. It will be observed that the results obtained with all of the three two-part combinations are nothing more than the expected results, i.e., a mean of the growth rates induced by each of the two components when used individually. The significance of the growth promoting activity of the three-part additive of this invention is borne out further by the fact that none of the two-part combinations produce a growth rate greater than that of the single additives from which they are derived. On the other hand, the three-part combination of the present invention produced a growth rate significantly greater than any of the single additives or any of the two-part combinations thereof. Accordingly, the results obtained with this three-part combination exhibit synergistic action.

The quantities and identities of the several additives of this invention may be varied substantially. It is preferable to use 75 mg. of chlortetracycline per steer per day, 10 mg. of stilbestrol (diethylstilbestrol) per steer per day, and 2 g. of phenothiazine per steer per day. However, since a variety of animals may be fed the feed composition of this invention, other quantities of the above compounds and their derivatives may be required. Accordingly, 5.0 to 50 mg. of one of the tetracyclines (e.g., tetracycline, chlortetracycline, oxytetracycline, bromotetracycline or any of their acid or metallic salts) per 100 lbs. of animal body weight per day is recommended. In a similar manner, 0.1 to 8.0 mg. of an estrogen derivative (e.g., diethylstilbestrol, hexestrol, benzestrol, and esters and ethers thereof such as the diacetate, dibenzoate, dipalmitate, dipropionate, dimethyl ether, monomethyl ether, etc.) per 100 lbs. of animal body weight per day should be used. Also, it is recommended that from 100 to 400 mg. per 100 lbs. of animal body weight per day of phenothiazine be used.

For the purposes of this invention, diethylstilbestrol is defined as 3,4-bis(p-hydroxyphenyl)-3-hexene; hexestrol is meso-3,4-bis(p-hydroxyphenyl)-n-hexane; and benzestrol is 3-ethyl-2,4-bis(p-hydroxyphenyl)-hexane.

Examples of other animals within the purview of this invention are chickens, ducks, geese and other poultry, sheep, goats, swine, and horses. Equivalent procedures, animals to be treated, and quantities of and identities of materials to be utilized will be apparent to those skilled in the art. The foregoing data and discussions are therefore meant to be illustrative only, the scope of the invention being limited only by the appended claims.

We claim:
1. An animal feed composition effective in accelerating the growth rate of animals comprising in a minor but effective amount in combination about 5.0 to 50 parts by weight of a tetracycline antibiotic, 0.1 to 8 parts by weight of an estrogenic substance, and about 100 to 400 parts by weight of phenothiazine, and in a major amount an edible animal feedstuff.

2. The animal feed composition of claim 1 further characterized in that said tetracycline antibiotic is one selected from the group consisting of chlortetracycline, tetracycline, oxytetracycline, bromotetracycline, and the acid and metallic salts thereof, and said estrogenic substance is one selected from the group consisting of diethylstilbestrol, hexestrol, benzestrol, and esters and ethers thereof.

3. The feed composition of claim 2 further characterized in that said antibiotic is tetracycline.

4. The feed composition of claim 2 further characterized in that said antibiotic is chlortetracycline.

5. The feed composition of claim 2 further characterized in that said antibiotic is oxytetracycline.

6. The feed composition of claim 2 further characterized in that said estrogenic substance is diethylstilbestrol.

7. The feed composition of claim 2 further characterized in that said estrogenic substance is hexestrol.

8. The feed composition of claim 2 further characterized in that said estrogenic substance is benzestrol.

9. The feed composition of claim 2 further characterized in that said antibiotic is present in an amount of from about 5.8 to 12.5 parts by weight, said estrogenic substance is present in an amount of from about 0.77 to 1.67 parts by weight, and said phenothiazine is present in an amount of from about 154 to 333 parts by weight.

10. The animal feed composition of claim 9 further characterized in that said antibiotic is chlortetracycline, said estrogenic substance is diethylstilbestrol.

11. The feed composition of claim 9 further characterized in that said antibiotic is tetracycline, said estrogenic substance is diethylstilbestrol.

12. The feed composition of claim 9 further characterized in that said antibiotic is oxytetracycline, said estrogenic substance is diethylstilbestrol.

13. A method of accelerating the growth rate of animals comprising administering orally to animals a composition which comprises in a minor but effective amount in combination about 5.0 to 50 parts by weight of a tetracycline antibiotic, about 0.1 to 8 parts by weight of an estrogenic substance, about 100 to 400 parts by weight of phenothiazine, and in a major amount an edible animal feed.

14. The method of claim 13 in that said antibiotic is chlortetracycline, said estrogenic substance is diethylstilbestrol.

References Cited in the file of this patent

UNITED STATES PATENTS 2,703,285    Luther _____ Mar. 1, 1955
2,773,770    Maki et al. _____ Dec. 11, 1956

OTHER REFERENCES

Jr. Animal Science, vol. 15 (November 1956), p. 1293.
Dixon Springs Exp. Sta., Progress Report, 1956, Univ. of Illinois, pp. 15 and 16.
Sewell et al.: Jr. Animal Science, February 1957, 16, pp. 20–25.